(12) United States Patent
Deng et al.

(10) Patent No.: US 11,366,038 B1
(45) Date of Patent: Jun. 21, 2022

(54) VIBRATION TEST BENCH FOR ELECTRODYNAMIC-SUSPENSION MAGNETIC LEVITATION (MAGLEV) TRAINS AND TESTING METHOD USING SAME

(71) Applicant: Southwest Jiaotong University, Chengdu (CN)

(72) Inventors: Zigang Deng, Chengdu (CN); Dingding Wu, Chengdu (CN); Yuhang Yuan, Chengdu (CN); Huan Huang, Chengdu (CN); Hongfu Shi, Chengdu (CN); Jun Zheng, Chengdu (CN); Jianghua Zhang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 17/540,622

(22) Filed: Dec. 2, 2021

(30) Foreign Application Priority Data

Apr. 14, 2021 (CN) .......................... 202110399705.5

(51) Int. Cl.
*G01M 17/10* (2006.01)
*G01M 7/02* (2006.01)
(52) U.S. Cl.
CPC ............ *G01M 7/027* (2013.01); *G01M 17/10* (2013.01)
(58) Field of Classification Search
CPC ............................. G01M 7/027; G01M 17/10
(Continued)

(56) References Cited

U.S. PATENT DOCUMENTS 3,858,521 A * 1/1975 Atherton ................. B60L 13/04
  104/285
3,903,809 A * 9/1975 Miericke ................. B61B 13/08
  104/285
(Continued)

FOREIGN PATENT DOCUMENTS

CN 101813566 A 8/2010
CN 101849068 * 9/2010 ........... E01B 19/003
(Continued)

OTHER PUBLICATIONS

Journal of Sound and Vibration, Magnetically suspended flywheel in gimbal mount—Test bench design and experimental validation Nikolaj A. Dagnaes-Hansen, Ilmar F. Santos* Department of So/id Mechanics, Technical University of Denmark, Kgs. Lyngby, Denmark (Year: 2019).*

(Continued)

*Primary Examiner* — Jacques M Saint Surin (57) ABSTRACT

A vibration test bench for electrodynamic-suspension magnetic levitation trains and a testing method using the same. The vibration test bench includes an adjustable track mounting surface, a track base, a guiding track and a simulated levitation device. The track base includes a first track base and a second track base. The first track base and the second track base are respectively provided at two sides of the adjustable track mounting surface. The guiding track is arranged at a bottom of the track base and can be embedded in the T-shaped bolt mounting grooves on the adjustable track mounting surface to move. The simulated levitation device is arranged on the track base and is configured to levitate the magnetic levitation train between the first track base and the second track base.

8 Claims, 3 Drawing Sheets

(58) Field of Classification Search
USPC .......................................................... 73/663
See application file for complete search history.

(56) References Cited

U.S. PATENT DOCUMENTS

| | | | | |
|---|---|---|---|---|
| 5,253,592 | A | * | 10/1993 | Coffey .................... B60L 13/10 |
| | | | | 104/286 |
| 2002/0005069 | A1* | | 1/2002 | Nichols ................... G01M 7/06 |
| | | | | 73/662 |

FOREIGN PATENT DOCUMENTS

| | | | | | |
|---|---|---|---|---|---|
| CN | 101995322 | A | | 3/2011 | |
| CN | 102252815 | A | | 11/2011 | |
| CN | 105136488 | A | | 12/2015 | |
| CN | 106240399 | A | | 12/2016 | |
| CN | 108448873 | A | | 8/2018 | |
| CN | 109239497 | A | | 1/2019 | |
| CN | 109532509 | | * | 3/2020 | ........... G15B 13/042 |
| CN | 111351626 | A | | 6/2020 | |
| CN | 111999079 | A | | 11/2020 | |
| CN | 112098116 | A | | 12/2020 | |
| CN | 112798210 | | * | 5/2021 | ............ G01M 17/08 |
| DE | 102010060501 | A1 | * | 5/2012 | ............ G01M 17/10 |
| EP | 1312909 | A1 | | 5/2003 | |
| EP | 3653462 | A1 | | 5/2020 | |
| EP | 3778337 | A1 | | 2/2021 | |
| JP | H08275309 | | * | 10/1996 | |
| JP | 2000283894 | A | | 10/2000 | |
| JP | 2014119336 | A | | 6/2014 | |

OTHER PUBLICATIONS

Xiaojie Su, Xiaozhan Yang, Peng Shi and Liang Wu; Fuzzy control of nonlinear electromagnetic suspension systems; Dec. 31, 2014; Space Control and Inertial Technology Research Center, Harbin Institute of Technology, Harbin 150001, China.

Deng Zigang and Li Haitao; Recent Development of High-Temperature Superconducting Maglev; Dec. 31, 2017; State Key Laboratory of Traction Power, Southwest Jiaotong University, Chengdu 610031, China.

Beini Niu; Design and Analysis the Model of Reliability Testing Equipment of High-Speed Train Transmission System; 201-09-15.

* cited by examiner

VIBRATION TEST BENCH FOR ELECTRODYNAMIC-SUSPENSION MAGNETIC LEVITATION (MAGLEV) TRAINS AND TESTING METHOD USING SAME

CROSS-REFERENCE TO RELATED APPLICATIONS

This application claims the benefit of priority from Chinese Patent Application No. 202110399705.5, filed on Apr. 14, 2021. The content of the aforementioned application, including any intervening amendments thereto, is incorporated herein by reference.

TECHNICAL FIELD

The present application relates to magnetic levitation trains, and more particularly to a vibration test bench for electrodynamic-suspension magnetic levitation trains and a testing method using the same.

BACKGROUND

The electrodymanic suspension (EDS) is operated based on Lenz's law. When an electrodymanic suspension train is running, the magnetic field lines generated by a magnet mounted on the EDS train are cut by a coil or a conductor plate on the ground to generate an induced current, and the induced current in the coil or the conductor plate generates a magnetic field, which interacts with the magnetic field of the magnet to produce a levitation force. The levitation force increases with the increase of the speed of the train. When the levitation force rises to be high enough to overcome the gravity of the train, the train will be levitated. Under the effect of the coil, the magnet on the train can be simultaneously subjected to a levitation force, a guiding force and a driving force. At the same time, the EDS system has a high self-stability and does not require a complicated control system.

As a maglev rail transport system designed to run at a super-high speed (600 km/h), the EDS train needs to be sufficiently tested before being put into commercial operation. Although real and reliable data can be obtained by operating the train on a test line, the test line needs to be long enough to meet the high-speed operation of the train. Moreover, the test line has a high construction cost and a large space occupation. Therefore, in the early research stage, it is generally required to carry out a long-term running test on a test bench. With regard to the wheel-rail train test bench, the operation of the train is simulated by converting the linear motion into the rotary motion. However, this method is difficult to simulate the real operation of the EDS train, and is of great danger under the high-speed operation. At present, it has been less investigated on test technology for the EDS train, and thus there is an urgent need to develop a test device that can simulate the operation of the EDS train on the actual track line and test its performance.

SUMMARY

To overcome the above-mentioned defects, an object of the present disclosure is to provide a vibration test bench for electrodynamic-suspension (EDS) magnetic levitation trains and a testing method using the same.

The technical solutions of the disclosure are described below.

In a first aspect, the present disclosure provides a vibration test bench for an electrodynamic-suspension magnetic levitation train, comprising:
 an adjustable track mounting surface;
 a track base;
 a guiding track; and
 a simulated levitation device;
 wherein the adjustable track mounting surface is provided with a plurality of longitudinal T-shaped bolt mounting grooves and a plurality of transverse T-shaped bolt mounting grooves; the track base comprises a first track base and a second track base; the first track base is arranged at one side of the adjustable track mounting surface, and the second track base is arranged on the other side of the adjustable track mounting surface;
 the guiding track is arranged at a bottom of the track base and is configured to be embedded in the T-shaped bolt mounting grooves to move; and
 the simulated levitation device is arranged on the track base and is configured to levitate the magnetic levitation train between the first track base and the second track base.

In some embodiments, the simulated levitation device comprises a coil heat dissipation container and a levitation-guidance coil; the coil heat dissipation container is arranged on the track base; and the levitation-guidance coil is arranged in the coil heat dissipation container.

In some embodiments, a gap is provided between a casing of the coil heat dissipation container and the levitation-guidance coil; a cooling medium port is provided on the coil heat dissipation container to allow a cooling medium to flow into and out of the coil heat dissipation container; and the cooling medium is a high-speed air flow, a non-conductive cooling liquid or liquid nitrogen.

In some embodiments, a coil mounting frame is arranged in the coil heat dissipation container; the coil mounting frame is provided with a groove; and the levitation-guidance coil is arranged in the groove.

In some embodiments, the vibration test bench further comprises an auxiliary constraint platform for a levitation frame of the electrodynamic-suspension magnetic levitation train and a longitudinal pull rod for the levitation frame of the electrodynamic-suspension magnetic levitation train; the auxiliary constraint platform comprises a first auxiliary constraint platform and a second auxiliary constraint platform; the first constraint auxiliary platform and the second constraint auxiliary platform are both arranged on the adjustable track mounting surface, and located between the first track base and the second track base; and one end of the first longitudinal pull rod is hinged on the auxiliary constraint platform, and the other end of the first longitudinal pull rod is hinged with the levitation frame of the electrodynamic-suspension magnetic levitation train.

In some embodiments, the vibration test bench further comprises a hydraulic cylinder; wherein the hydraulic cylinder comprises a first hydraulic cylinder, a second hydraulic cylinder, a third hydraulic cylinder and a fourth hydraulic cylinder; the first hydraulic cylinder and the second hydraulic cylinder are respectively arranged on two sides of the first track base; the third hydraulic cylinder and the fourth hydraulic cylinder are respectively arranged on two sides of the second track base; the first hydraulic cylinder and the second hydraulic cylinder are arranged in parallel; the third hydraulic cylinder and the fourth hydraulic cylinder are arranged in parallel; one end of the first hydraulic cylinder is connected to the first track base, and the other end of the first hydraulic cylinder is fixedly arranged on the adjustable track mounting surface; one end of the second hydraulic cylinder is connected to the first track base, and the other end of the second hydraulic cylinder is fixedly arranged on the adjustable track mounting surface; one end of the third hydraulic cylinder is connected to the second track base, and the other end of the third hydraulic cylinder is fixedly arranged on the adjustable track mounting surface; and one end of the fourth hydraulic cylinder is connected to the second track base, and the other end of the fourth hydraulic cylinder is fixedly arranged on the adjustable track mounting surface.

In some embodiments, a first end of the longitudinal pull rod is provided with a first rubber joint, and a second end of the longitudinal pull rod is provided with a second rubber joint; and the first end of the longitudinal pull rod is connected to the auxiliary constraint platform through the first rubber joint, and the second end of the longitudinal rod is connected to the levitation frame of the electrodynamic-suspension magnetic levitation train through the second rubber joint.

In a second aspect, the present disclosure provides a testing method using the above vibration test bench, comprising:

acquiring a first input information, wherein the first input information comprises an information confirming that the first track base and the second track base are installed;

acquiring a second input information, wherein the second input information comprises an information confirming that an electrodynamic-suspension magnetic levitation train to be tested is placed on the auxiliary constraint platform and connected to the longitudinal pull rod;

sending a first control command, wherein the first control command comprises a command for controlling the simulated levitation device to start;

sending a second control command, wherein the second control command comprises a command for controlling a vertical hydraulic actuator and a transverse hydraulic actuator to start; and acquiring a test data, wherein the test data comprises a first test data and a second test data; the first test data comprises data of an acceleration sensor arranged in the electrodynamic-suspension magnetic levitation train to be tested; and the second test data comprises data of a displacement sensor arranged in the electromagnetic levitation train to be tested.

In some embodiments, the testing method further comprises:

acquiring a third input information, wherein the third input information comprises a first width, and the first width is a width that needs to be reached between the first track base and the second track base;

acquiring a fourth input information, wherein the fourth input information comprises a second width, and the second width is a current width between the first track base and the second track base.

calculating an information required for the first track base and the second track base to move to a target position according to a relationship between the first width and the second width, wherein the information comprises a moving direction and a moving distance needed by the first track base and the second track base;

acquiring a fifth input information if the moving distance is not zero, wherein the fifth input information comprises an information confirming that bolts and nuts configured to fix the track base are loosened; and sending a third control command, wherein the third control command comprises a command for controlling the hydraulic cylinder to move the first track base and the second track base to the target position.

The beneficial effects of the present disclosure are described as follows.

(1) The vibration test bench provided herein can be used to test the dynamic performance of a whole train or a single levitation frame under free suspension, and can also be applied to test the vehicle-track coupling dynamic performance, allowing for a wide application range.

(2) In the vibration test bench of the present disclosure, the distance between the first track base and the second track base is adjustable such that simulation experiments of the vehicle-track coupling vibration of the magnetic levitation train can be carried out under different track gauges. The distance is adjusted by using hydraulic cylinders, which facilitates reducing the time and labor consumption.

(3) The transverse and vertical actuations are introduced to simulate various working conditions such as track irregularity, curve negotiation and transverse impact.

(4) The test process of the present disclosure has high degree of automation such that the operation is safe and reliable and the test result is accurate.

Other features and advantages of the present disclosure will be described below, and are partly apparent from the description or are understood based on the embodiments of the present disclosure. The objects and other advantages of the present disclosure may be realized and obtained by means of the structure specially indicated in the description, claims and drawings.

BRIEF DESCRIPTION OF THE DRAWINGS

To explain the technical solutions of the embodiments of the present disclosure more clearly, the drawings that need to be used in the embodiments will be briefly introduced below. It should be understood that presented in the following drawings are only some embodiments of the present disclosure, and are not intended to limit the scope of the present disclosure. For those skilled in the art, other related drawings can be obtained based on the drawings provided herein without paying creative effort.

In the drawings, 1, coil heat dissipation container; 2, levitation-guidance coil; 3, driving coil; 4, coil mounting frame; 5, cooling medium port; 6, first longitudinal pull rod; 7, first auxiliary constraint platform; 8, adjustable track mounting surface; 9, second spring mounting seat; 10, track beam simulation system; 11, first spring mounting seat; 12, second longitudinal pull rod; 13, secondary platform; 14, primary platform; 15, transverse hydraulic actuator; 16, support platform of the hydraulic excitation system; 17, air spring support rod; 18, support seat of the primary platform; 19, converter; 20, industrial computer; 21, cable; 22, air spring; 23, air spring mounting seat; 24, transverse pull rod; 25, mounting seat of the vertical hydraulic actuator; 26, vertical hydraulic actuator; 27, base of the hydraulic excitation system; 28, mounting seat of the transverse hydraulic actuator; 29, third longitudinal pull rod; 30, first track base; and 31, first hydraulic cylinder.

DETAILED DESCRIPTION OF EMBODIMENTS

The disclosure will be described completely and clearly below with reference to the accompanying drawings and embodiments to make the object, technical solutions, and beneficial effects of the present disclosure clearer. Obviously, provided below are merely some embodiments of the disclosure. The components described and illustrated in the drawings herein can be arranged and designed in various configurations. Therefore, the embodiments provided in the accompanying drawings are merely illustrative, and are not intended to limit the scope of the present disclosure. Based on the embodiments of the present disclosure, all other embodiments obtained by those skilled in the art without paying any creative effort shall fall within the scope of the present disclosure.

It should be noted that similar reference numerals or letters indicate similar elements in the following drawings. Therefore, once a certain element is defined in one drawing, it does not need to be further defined and explained in subsequent drawings. At the same time, as used herein, the terms "first", "second", etc. are only used to distinguish the elements referred to, and cannot be understood to indicate or imply relative importance.

Embodiment 1

Figure 1:
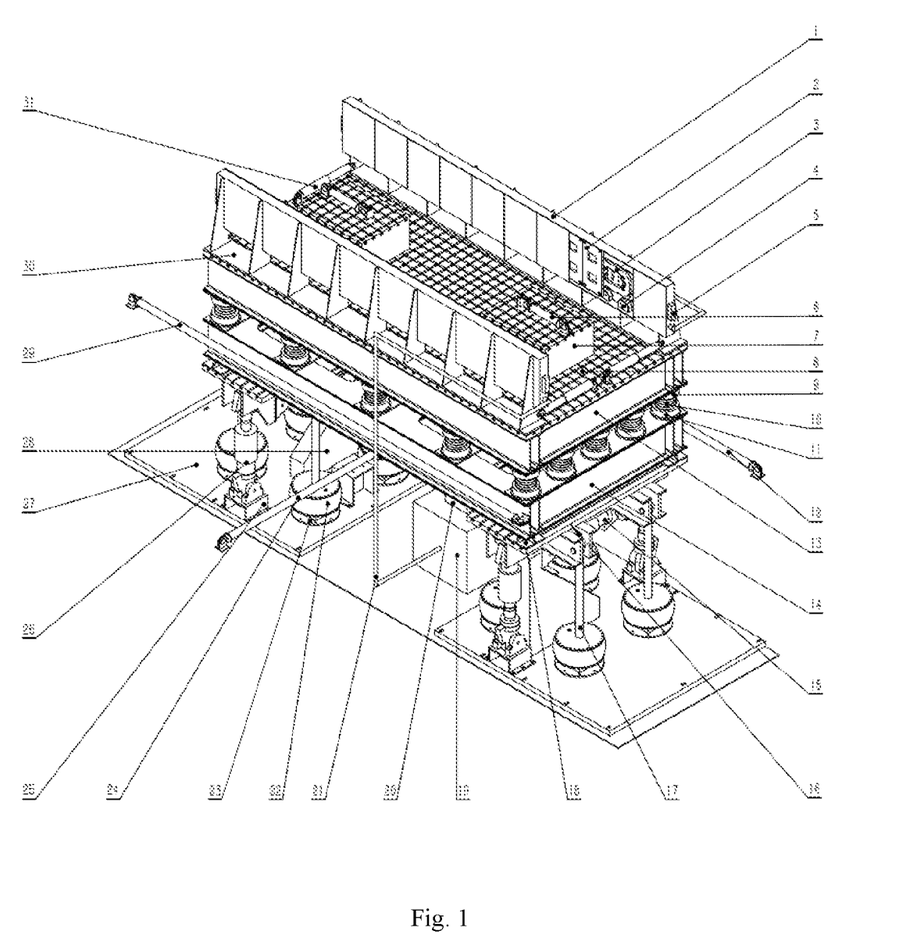
FIG. 1 schematically shows a structure of a vibration test bench for an electrodynamic-suspension magnetic levitation train according to an embodiment of the present disclosure.

As shown in FIG. 1, provided herein is a vibration test bench for electrodynamic-suspension magnetic levitation trains. The vibration test bench includes a base 27 of a hydraulic excitation system, a vertical hydraulic actuator 26, a mounting seat 28 of a transverse hydraulic actuator 15, a support platform 16 of the hydraulic excitation system, the transverse hydraulic actuator 15, a primary platform 14 for simulating the ground, a support seat 18 of the primary platform 14, a secondary platform 13 for simulating track beam, an adjustable track mounting surface 8, a track base, a guiding track and a simulated levitation device.

A mounting seat 25 of the vertical hydraulic actuator 26 is arranged on the base 27 of the hydraulic excitation system. The vertical hydraulic actuator 26 is connected to the base 27 of the hydraulic excitation system through the mounting seat 25. The vertical hydraulic actuator 26 is configured to provide a vertical exciting force. The mounting seat 28 of the transverse hydraulic actuator 15 is arranged on the base 27 of hydraulic excitation system. A bottom of support platform 16 of the hydraulic excitation system is connected to an upper end of the vertical hydraulic actuator 26. The transverse hydraulic actuator 15 is arranged between the mounting seat 28 and the support platform 16 of the hydraulic excitation system, and is configured to provide a transverse exciting force. The vertical exciting force and the transverse exciting force respectively provided by the vertical hydraulic actuator 26 and the transverse hydraulic actuator 15 are used to simulate various working conditions such as track irregularity, curve negotiation and lateral impact.

The support seat 18 of the primary platform 14 is connected above the support platform 16 of the hydraulic excitation system. The primary platform 14 is connected above the support seat 18. An upper end of the primary platform 14 is provided with a first spring mounting seat 11. The secondary platform 13 is connected above the primary platform 14. A lower end of the secondary platform 13 is provided with a second spring mounting seat 9. A track beam simulation system 10 with adjustable stiffness is arranged between the first spring mounting seat 11 and the second spring mounting seat 9.

The adjustable track mounting surface 8 is connected above the secondary platform 13, and is provided with a plurality of longitudinal and transverse T-shaped bolt mounting grooves. The track base includes a first track base 30 and a second track base. The first track base 30 is provided at one side of the adjustable track mounting surface 8, and the second track base is provided at the other side of the adjustable track mounting surface 8. A guiding track is arranged at a bottom of the track base, and can be embedded in the T-shaped bolt mounting grooves, that is, the cross section of the guiding track is T-shaped, so as to adjust the distance between the first track base 30 and the second track base and enable the guiding track to move in the T-shaped bolt mounting grooves. The simulated levitation device is arranged on the track base, and is configured to levitate the magnetic levitation train between the first track base 30 and the second track base to simulate the running conditions of the magnetic levitation train on the real track.

In an embodiment, the simulated levitation device includes a coil heat dissipation container 1 and a levitation-guidance coil 2. The coil heat dissipation container 1 is arranged on the track base. The levitation-guidance coil 2 is arranged in the coil heat dissipation container 1.

In an embodiment, the simulated levitation device includes the coil heat dissipation container 1, the levitation-guidance coil 2, a converter 19 and an industrial computer 20. The converter 19 is connected to the levitation-guidance coil 2. The industrial computer 20 is electrically connected to the converter 19. The magnitude and waveform of an alternating current flowing from the converter 19 to the levitation-guidance coil 2 are controlled by the industrial computer 20.

In an embodiment, a coil mounting frame 4 is arranged in the coil heat dissipation container 1. The coil mounting frame 4 is provided with a groove, in which the levitation-guidance coil 2 is arranged. A bottom of the groove is provided with a driving coil 3.

In an embodiment, a gap is provided between a casing of the coil heat dissipation container 1 and the levitation-guidance coil 2. A cooling medium port 5 is arranged on the coil heat dissipation container 1 to allow a cooling medium to flow into or out of the coil heat dissipation container 1. The cooling medium is a high-speed air flow, a non-conductive cooling liquid or liquid nitrogen. During the test, due to the long-term passing of a large current, the coil will generate a considerable amount of heat, so the cooling medium is introduced into the coil heat dissipation container 1 to dissipate the heat generated by the coil.

In an embodiment, the casing of the coil heat dissipation container 1 is made of aluminum or epoxy resin. The aluminum casing can shield the unnecessary high-frequency magnetic field generated by the current in the coil.

In an embodiment, the vibration test bench further includes an auxiliary constraint platform for a levitation frame of the maglev train and a first longitudinal pull rod 6. The auxiliary constraint platform includes a first auxiliary constraint platform 7 and a second auxiliary constraint platform. The first auxiliary constraint platform 7 and the second auxiliary constraint platform are both arranged on the adjustable track mounting surface 8, and located between the first track base 30 and the second track base. The distance between the first auxiliary constraint platform 7 and the second auxiliary constraint platform should be designed to be slightly larger than the length of the magnetic levitation train to be tested to place the magnetic levitation train to be tested. In addition, the auxiliary constraint platform can be integrally designed instead of being divided into the first auxiliary constraint platform 7 and the second auxiliary constraint platform. Moreover, the auxiliary constraint platform can also be configured to move up, down, left and right to improve the convenience of the test. Two ends of the first longitudinal pull rod 6 are respectively provided with a rubber joint, where one end of the first longitudinal pull rod 6 is hinged on the auxiliary constraint platform, and the other end of the first longitudinal pull rod 6 is hinged with the levitation frame of the magnetic levitation train.

When a static test is performed, the magnetic levitation train is fixed on the auxiliary constraint platform. When a free suspension test of the whole train (including the levitation frame) or the levitation frame is performed, the longitudinal displacement of the levitation frame is constrained by the first longitudinal pull rod 6 arranged on the auxiliary constraint platform. Considering that an object has six degrees of freedom, that is, the translation along the three coordinate axes and the rotation around the three coordinate axes, a gravity direction is defined as a vertical direction; a running direction is defined as a longitudinal direction; and a direction perpendicular to the running direction on the horizontal plane is defined as a transverse direction. The levitation force and the guidance force provided by the levitation-guidance coil are controllable respectively along the vertical direction and the transverse direction, so the magnetic levitation train can be constrained in the vertical and transverse directions. The coil may generate a longitudinal force on the train but does not generate a longitudinal constraint, so it is necessary to provide a longitudinal pull rod to restrict the degree of freedom of the longitudinal displacement of the levitation frame to restrict the longitudinal displacement of the levitation frame.

In an embodiment, the vibration test bench further includes a hydraulic cylinder, which includes a first hydraulic cylinder 31, a second hydraulic cylinder, a third hydraulic cylinder and a fourth hydraulic cylinder. The first hydraulic cylinder 31 is arranged on one side of the first track base 30, and the second hydraulic cylinder is arranged on the other side of the first track base 30. The first hydraulic cylinder 31 and the second hydraulic cylinder are arranged in parallel. The third hydraulic cylinder is arranged on one side of the second track base, and the fourth hydraulic cylinder is arranged on the other side of the second track base. The third hydraulic cylinder and the fourth hydraulic cylinder are arranged in parallel. One end of the first hydraulic cylinder 31 is connected to the first track base 30, and the other end of the first hydraulic cylinder 31 is fixedly arranged on the adjustable track mounting surface 8. One end of the second hydraulic cylinder is connected to the first track base 30, and the other end of the second hydraulic cylinder is fixedly arranged on the adjustable track mounting surface 8. One end of the third hydraulic cylinder is connected to the second track base, and the other end of the third hydraulic cylinder is fixedly arranged on the adjustable track mounting surface 8. One end of the fourth hydraulic cylinder is connected to the second track base, and the other end of the fourth hydraulic cylinder is fixedly arranged on the adjustable track mounting surface 8.

The distance between the first track base and the second track base is equivalent to the track gauge. When the distance needs to be adjusted, the bolts and nuts configured to fix the first track base and the second track base are loosened, and the hydraulic cylinder is controlled by the hydraulic system to pull the first track base and the second track base to move transversely to a target position, and then the first track base and the second track base are fixed on the adjustable track mounting surface 8 through the bolts and nuts. In this way, simulation experiments of the vehicle-track coupled vibration of the magnetic levitation train can be carried out under different track gauges.

In an embodiment, a first end of the first longitudinal pull rod 6 is provided with a first rubber joint, and a second end of the first longitudinal pull rod 6 is provided with a second rubber joint. The first end of the first longitudinal pull rod 6 is connected to the auxiliary constraint platform through the first rubber joint, and the second end of the first longitudinal rod 6 is connected to the levitation frame through the second rubber joint. The rubber joints can constrain the movement of the node while retaining the rotational freedom in three directions, and can retain a certain degree of elasticity while rotating to buffer the shock and vibration between the two components connected by the rubber joint.

In an embodiment, the first track base 30 and the second track base are fixedly arranged on the adjustable track mounting surface 8 through bolts and nuts. The coil heat dissipation container 1 is mounted on the track base through bolts. The coil mounting frame 4 is provided with a mounting hole, and a screw is inserted into the mounting hole to mount the coil mounting frame 4 in the coil heat dissipation container 1. The assembly and disassembly of the device can be realized by using bolts and nuts, facilitating the process of installation and disassembly.

In an embodiment, an upper end of an air spring support rod 17 is hinged with a lower end of the support platform 16 of the hydraulic excitation system to realize a full-rotational-degree-of-freedom rotation within a certain range. A lower end of the air spring support rod 17 is connected to an air spring 22. The air spring 22 is mounted on an air spring mounting seat 23. The air spring mounting seat 23 is mounted on the base 27 of the hydraulic excitation system.

In an embodiment, the primary platform 14 is provided with a limiting device configured to prevent a horizontal displacement of the primary platform 14. The limiting device includes a second longitudinal pull rod 12, a third longitudinal pull rod 29 and a transverse pull rod 24. One end of each pull rod is connected to the primary platform 14 through a rubber joint and a bolt, and the other end of each pull rod is connected to a fixed point on the ground through a rubber joint.

In an embodiment, the primary platform 14 and the secondary platform 13 both have a hollow van-shaped structure formed by welding longitudinal beams, cross beams and a bottom plate, where the longitudinal beams and the cross beams are made of I steels, and the bottom plate is made of a steel plate. The mass of the track beam can be adjusted by adding or removing the standard mass block in the hollow van-shaped structure of the secondary platform 13. The track beam simulation system 10 is composed of a plurality of springs. One end of each of the springs is arranged on the first spring mounting seat 11, and the other end of each of the springs is arranged on the second spring mounting seat 9. The number, position and model of the springs can be adjusted to regulate the stiffness, so as to simulate the track beams with different stiffness.

In an embodiment, the transmission route of the vertical excitation of the tested magnetic levitation train is described below. The industrial computer 20 controls the vertical hydraulic actuator 26 to operate to generate an exciting force and displacement. The exciting force is transferred to the support platform 16 of the hydraulic excitation system, the primary platform 14, the track beam simulation system 10, the secondary platform 13, and the track arranged on the adjustable track mounting surface 8 in sequence, and finally transferred to the magnetic levitation train levitated on the track through an electromagnetic effect.

In an embodiment, the transmission route of the transverse excitation of the tested magnetic levitation train is described below. The industrial computer 20 controls the transverse hydraulic actuator 15 to operate to generate an exciting force and displacement. The exciting force is transferred to the support platform 16 of the hydraulic vibration excitation system, the primary platform 14, the track beam simulation system 10, the secondary platform 13, and the track base, the levitation-guidance coil 2 and the driving coil 3 arranged on the adjustable track mounting surface 8 in sequence, and finally transferred to the magnetic levitation train levitated on the track through an electromagnetic effect.

In an embodiment, the electrodynamic suspension static test route is described below. The tested magnetic levitation train is fixed on the auxiliary constraint platform. The industrial computer 20 controls the current in the levitation-guidance coil 2 to generate a simulated traveling wave magnetic field at different running speeds. The industrial computer 20 controls the current in the driving coil 3 to generate a magnetic field to drive the magnetic levitation train. The levitation force, guidance force and driving force applied to the vehicle-mounted magnet in the tested magnetic levitation train can be tested through a force sensor arranged between the levitation frame and the auxiliary constraint platform.

In an embodiment, the vehicle-track coupled vibration simulation test route of the magnetic levitation train is described as follows. The tested magnetic levitation train is placed on the auxiliary constraint platform, and the first longitudinal pull rod 6 is connected to the levitation frame. The industrial computer 20 controls the vertical hydraulic actuator 26 and the transverse hydraulic actuator 15 to operate to generate a vertical excitation and a transverse excitation at the corresponding speed, and controls the alternating current in the levitation-guidance coil 2 to generate a simulated traveling wave magnetic field. Then the simulation speed is gradually increased, and as the simulation speed gradually increases, the tested magnetic levitation train is gradually levitated and reaches a target speed, and simultaneously is subjected to the excitation produced by the hydraulic actuator. An acceleration sensor and a displacement sensor arranged on the tested magnetic levitation train or the levitation frame are used to test the levitation performance of the levitation system and the vibration characteristics of the tested magnetic levitation train. In addition, various response parameters of the selected track beam can be tested through the force sensor, displacement sensor and acceleration sensor arranged on the secondary platform 13.

Embodiment 2

Figure 2:
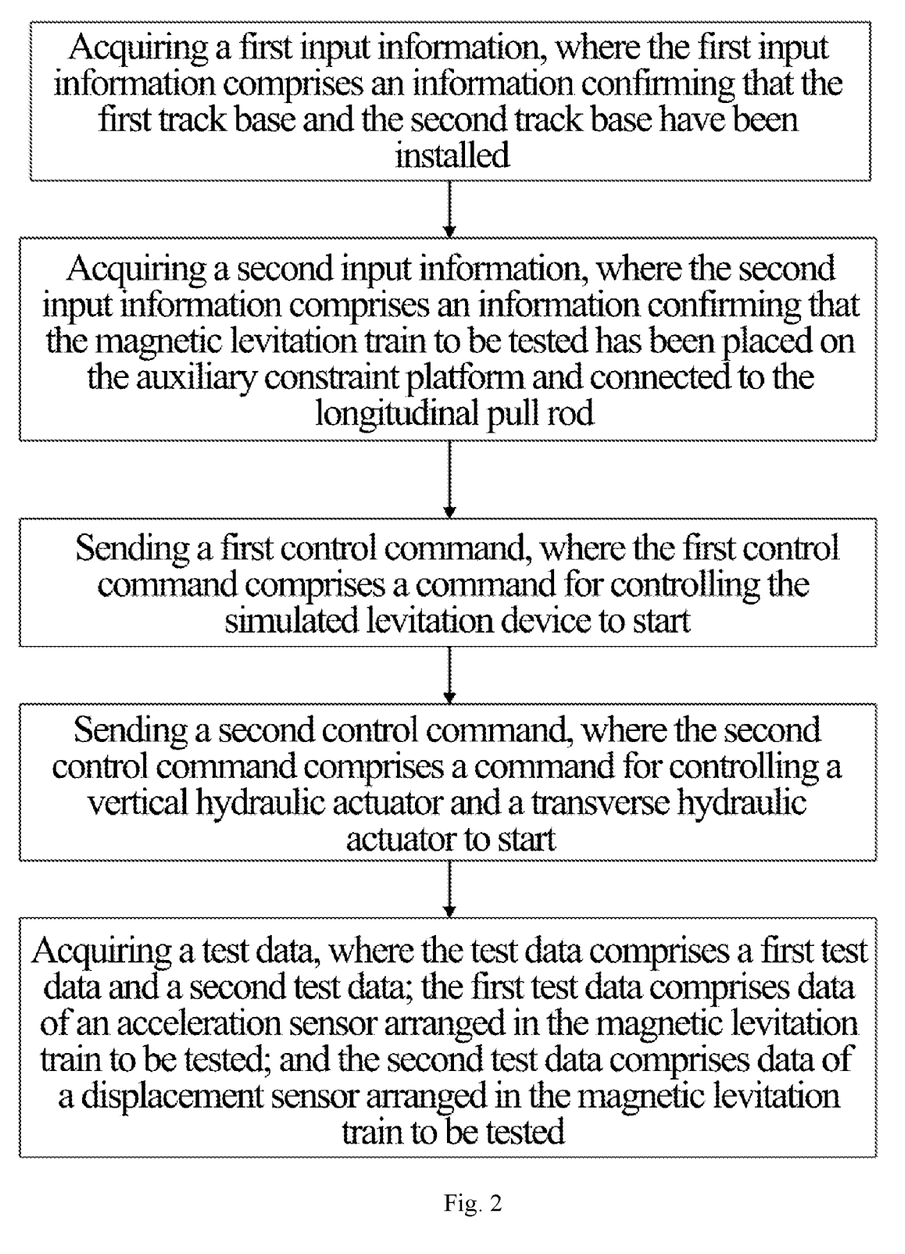
FIG. 2 is a flow chart of a testing method using the vibration test bench according to an embodiment of the present disclosure.

As shown in FIG. 2, provided herein is a testing method using the vibration test bench for electrodynamic-suspension magnetic levitation trains, which is specifically described as follows.

(S1) A first input information is acquired, where the first input information includes an information confirming that the first track base and the second track base have been installed.

(S2) A second input information is acquired, where the second input information includes a information confirming that a magnetic levitation train to be tested has been placed on the auxiliary constraint platform and connected to the first longitudinal pull rod 6.

(S3) A first control command is sent, where the first control command includes a command for controlling the simulated levitation device to start.

(S4) A second control command is sent, where the second control command includes a command for controlling the vertical hydraulic actuator 26 and the transverse hydraulic actuator 15 to start.

(S5) A test data is acquired, where the test data includes a first test data and a second test data; the first test data includes data of an acceleration sensor arranged in the magnetic levitation train to be tested; and the second test data includes data of a displacement sensor arranged in the magnetic levitation train to be tested.

The test process in the present disclosure has a high degree of automation, which reduces the labor intensity and avoids the adverse effects brought by human objective factors. Moreover, after the previous step has been confirmed, the next automatic operation will be carried out, enabling the safe, accurate and reliable test.

In an embodiment, the method also includes the following steps.

(S6) A third input information is acquired, where the third input information includes a first width, and the first width is a width that needs to be reached between the first track base and the second track base.

(S7) A fourth input information is acquired, where the fourth input information includes a second width, and the second width is a current width between the first track base and the second track base.

(S8) According to the relationship between the first width and the second width, an information required for the first track base and the second track base to move to a target position is calculated, where the information includes a moving direction and a moving distance needed by the first track base and the second track base.

(S9) If the moving distance is not zero, a fifth input information is acquired, where the fifth input information includes a information confirming that bolts and nuts configured to fix the track base are loosened.

(S10) A third control command is sent, where the third control command includes a command for controlling the hydraulic cylinder to move the first track base and the second track base to a target position.

Through the steps (S6)-(S10), the width between the first track base and the second track base can be adjusted, namely, the track gauge can be adjusted, which can support simulation experiments of the vehicle-track coupled vibration of the magnetic levitation train on an unused track. Moreover, during the width adjustment, the direction and distance of the first track base and the second track base needed to be adjusted are calculated by the computer, and then the hydraulic cylinder controls the first track base and the second track base to move to the target position. The whole process is carried out in an automated manner such that the first track base and the second track base can be accurately moved to the target position, improving the test reliability. In addition, the use of the hydraulic cylinder to control the movement of the first track base and the second track base can reduce the time and labor consumption.

In an embodiment, the method further includes steps (S11)-(S12).

(S11) A sixth input information is acquired, where the sixth input information includes an information confirming that the first track base and the second track base have been installed on the target position.

(S12) Step (S3) is repeated.

In an embodiment, the method further includes steps (S13)-(S15).

(S13) A sixth input information is acquired, where the sixth input information includes a threshold of a temperature in the coil heat dissipation container 1.

(S14) A seventh input information is acquired, where the seventh input information includes data of the temperature sensor in the coil heat dissipation container 1. Whether the data exceeds the threshold is determined.

(S15) If the data exceeds the threshold, a fourth control command or a fifth control command is sent, where the fourth control command includes a command for controlling a cooling medium control device to increase an output power until the data is less than the threshold; and the fifth control command includes a command for controlling an alarm device to issue an alarm signal.

Through the steps (S13)-(S15), the temperature in the coil heat dissipation container 1 can be monitored and adjusted in real time, so as to prevent an excessively-high temperature in the coil heat dissipation container 1 from adversely affecting the operation of the coil, thereby avoiding the adverse effects on the test results.

In an embodiment, step (S14) further includes step (S16) and step (S17).

(S16) Data of a first temperature sensor and a second temperature sensor respectively arranged on two sides of the coil heat dissipation container 1 is acquired, and data of a third temperature sensor arranged at the middle portion of the coil heat dissipation container 1 is acquired.

(S17) Data of the first temperature sensor, the second temperature sensor and the third temperature sensor is processed to obtain an average temperature data in the coil heat dissipation container 1, and then it is determined whether the average temperature data exceeds the threshold.

When the temperature sensor is arranged on one side of the coil heat dissipation container 1, or only one temperature sensor is arranged, the collected data cannot truly reflect the temperature near the coil. Therefore, through the steps (S16)-(S17), the data of multiple temperature sensors in the coil heat dissipation container 1 is collected to obtain the average temperature data in the coil heat dissipation container 1 to obtain more realistic and accurate temperature data in the coil heat dissipation container 1.

Embodiment 3

Figure 3:
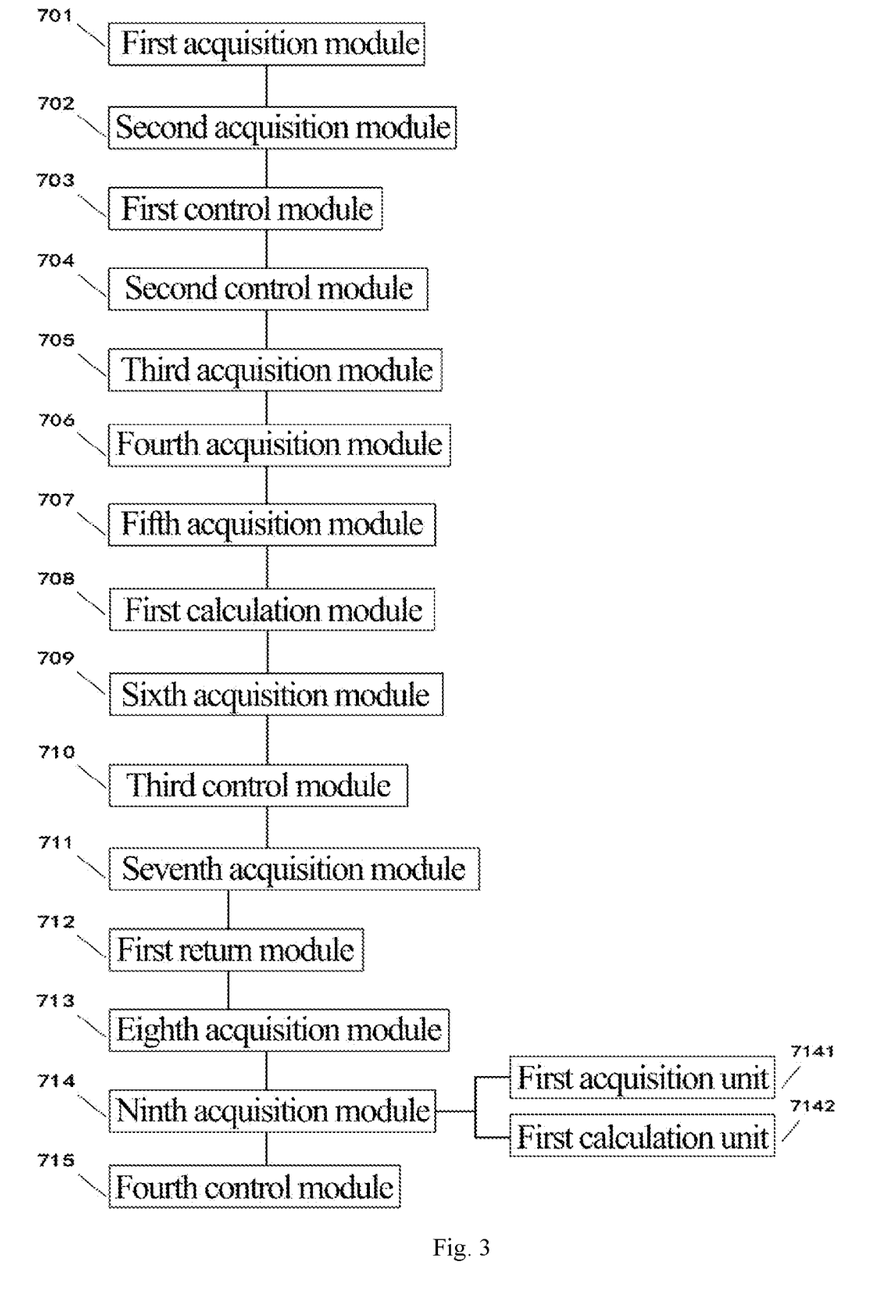
FIG. 3 schematically shows a structure of a testing device using the vibration test bench according to an embodiment of the present disclosure.

As shown in FIG. 3, provided in this embodiment is a device for performing the test using the test bench, including a first acquisition module 701, a second acquisition module 702, a first control module 703, and a second control module 704, and a third acquisition module 705.

The first acquisition module 701 is configured to obtain the first input information, where the first input information includes an information confirming that the first track base and the second track base have been installed.

The second acquisition module 702 is configured to acquire the second input information, where the second input information includes an information confirming that the electrodynamic-suspension magnetic levitation train to be tested has been placed on the auxiliary constraint platform and connected to the first longitudinal pull rod 6.

The first control module 703 is configured to send a first control command, where the first control command includes a command for controlling the simulated levitation device to start.

The second control module 704 is configured to send a second control command, where the second control command includes a command for controlling the vertical hydraulic actuator 26 and the transverse hydraulic actuator 15 to start.

The third acquisition module 705 is configured to acquire the test data, where the test data includes the first test data and the second test data; the first test data includes the data of the acceleration sensor arranged in the magnetic levitation train to be tested; and the second test data includes the data of the displacement sensor arranged in the magnetic levitation train to be tested.

In an embodiment, the device further includes a fourth acquisition module 706, a fifth acquisition module 707, a first calculation module 708, a sixth acquisition module 709, and a third control module 710.

The fourth acquisition module 706 is configured to acquire the third input information, where the third input information includes the first width that needs to be reached between the first track base and the second track base.

The fifth acquisition module 707 is configured to acquire the fourth input information, where the fourth input information includes the second width, which is a current width between the first track base and the second track base.

The first calculation module 708 is configured to calculate the information required for the first track base and the second track base to move to the target position according to the relationship between the first width and the second width, where the information includes the movement direction and distance needed by the first track base and the second track base.

The sixth acquisition module 709 is configured to obtain the fifth input information if the movement distance is not zero, where the fifth input information includes the information confirming that the bolts and nuts configured to fix the track base have been loosened.

The third control module 710 is configured to send the third control command, where the third control command includes the command for controlling the hydraulic cylinder to move the first track base and the second track base to the target position.

In an embodiment, the device further includes a seventh acquisition module 711 and a first return module 712.

The seventh acquisition module 711 is configured to acquire the sixth input information, where the sixth input information includes the information confirming that the first track base and the second track base have been installed on the target position.

The first returning module 712 is configured to repeat step (S3).

In an embodiment, the device further includes an eighth acquisition module 713, a ninth acquisition module 714, and a fourth control module 715.

The eighth acquisition module 713 is configured to obtain the sixth input information, where the sixth input information includes the threshold of the temperature in the coil heat dissipation container 1.

The ninth acquisition module 714 is configured to obtain the seventh input information, where the seventh input information includes data of the temperature sensor in the coil heat dissipation container 1, so as to determine whether the data exceeds the threshold.

The fourth control module 715 is configured to send the fourth control command or the fifth control command if the data exceeds the threshold, where the fourth control command includes the command for controlling the cooling medium control device to increase the output power until the data is less than the threshold; and the fifth control command includes the command for controlling the alarm device to issue an alarm signal.

In an embodiment, the ninth acquisition module 714 further includes a first acquisition unit 7141 and a first calculation unit 7142.

The first acquisition unit 7141 is configured to acquire the data of the first temperature sensor and the second temperature sensor arranged on two sides of the coil heat dissipation container 1 and the data of the third temperature sensor arranged at the middle portion of the coil heat dissipation container 1.

The first calculation unit 7142 is configured to process the data of the first temperature sensor, the second temperature sensor, and the third temperature sensor to obtain the average temperature data in the coil heat dissipation container 1, and then it is determined whether the average temperature data exceeds the threshold.

Described above are only preferred embodiments of the present disclosure and are not intended to limit the present disclosure. It should be understood that various modifications, replacements, changes made by those skilled in the art without departing the spirit and scope of the present disclosure should fall within the scope of the present disclosure defined by the appended claims.

What is claimed is:

1. A vibration test bench for an electrodynamic-suspension magnetic levitation train, comprising:
    an adjustable track mounting surface;
    a track base;
    a guiding track;
    a simulated levitation device; and
    a hydraulic cylinder;
    wherein the adjustable track mounting surface is provided with a plurality of longitudinal T-shaped bolt mounting grooves and a plurality of transverse T-shaped bolt mounting grooves; the track base comprises a first track base and a second track base; the first track base is arranged at one side of the adjustable track mounting surface, and the second track base is arranged on the other side of the adjustable track mounting surface;
    the guiding track is arranged at a bottom of the track base and is configured to be embedded in the plurality of longitudinal T-shaped bolt mounting grooves and the plurality of transverse T-shaped bolt mounting grooves and to move in the plurality of longitudinal T-shaped bolt mounting grooves and the plurality of transverse T-shaped bolt mounting grooves;
    the simulated levitation device is arranged on the track base and is configured to levitate the electrodynamic-suspension magnetic levitation train arranged between the first track base and the second track base;
    the vibration test bench further comprises an auxiliary constraint platform for a levitation frame of the electrodynamic-suspension magnetic levitation train and a longitudinal pull rod for the levitation frame of the electrodynamic-suspension magnetic levitation train; the auxiliary constraint platform comprises a first auxiliary constraint platform and a second auxiliary constraint platform; the first auxiliary constraint platform and the second auxiliary constraint platform are both arranged on the adjustable track mounting surface, and located between the first track base and the second track base; and one end of the longitudinal pull rod is hinged on the auxiliary constraint platform, and the other end of the longitudinal pull rod is hinged with the levitation frame of the electrodynamic-suspension magnetic levitation train; and
    the hydraulic cylinder comprises a first hydraulic cylinder, a second hydraulic cylinder, a third hydraulic cylinder and a fourth hydraulic cylinder; the first hydraulic cylinder is arranged on one side of the first track base, and the second hydraulic cylinder is arranged on the other side of the first track base; the third hydraulic cylinder is arranged on one side of the second track base, and the fourth hydraulic cylinder is arranged on the other side of the second track base; the first hydraulic cylinder and the second hydraulic cylinder are arranged in parallel; the third hydraulic cylinder and the fourth hydraulic cylinder are arranged in parallel; one end of the first hydraulic cylinder is connected to the first track base, and the other end of the first hydraulic cylinder is fixedly arranged on the adjustable track mounting surface; one end of the second hydraulic cylinder is connected to the first track base, and the other end of the second hydraulic cylinder is fixedly arranged on the adjustable track mounting surface; one end of the third hydraulic cylinder is connected to the second track base, and the other end of the third hydraulic cylinder is fixedly arranged on the adjustable track mounting surface; and one end of the fourth hydraulic cylinder is connected to the second track base, and the other end of the fourth hydraulic cylinder is fixedly arranged on the adjustable track mounting surface.

2. The vibration test bench of claim 1, wherein the simulated levitation device comprises a coil heat dissipation container and a levitation-guidance coil; the coil heat dissipation container is arranged on the track base; and the levitation-guidance coil is arranged in the coil heat dissipation container.

3. The vibration test bench of claim 2, wherein a gap is provided between a casing of the coil heat dissipation container and the levitation-guidance coil; a cooling medium port is provided on the coil heat dissipation container to allow a cooling medium to flow into and out of the coil heat dissipation container; and the cooling medium is a high-speed air flow, a non-conductive cooling liquid or liquid nitrogen.

4. The vibration test bench of claim 2, wherein a coil mounting frame is arranged in the coil heat dissipation container; the coil mounting frame is provided with a groove; and the levitation-guidance coil is arranged in the groove.

5. The vibration test bench of claim 1, wherein a first end of the longitudinal pull rod is provided with a first rubber joint, and a second end of the longitudinal pull rod is provided with a second rubber joint; and the first end of the longitudinal pull rod is connected to the auxiliary constraint platform through the first rubber joint, and the second end of the longitudinal rod is connected to the levitation frame of the electrodynamic-suspension magnetic levitation train through the second rubber joint.

6. A testing method using the vibration test bench of claim 1, comprising:
    acquiring a first input information, wherein the first input information comprises an information confirming that the first track base and the second track base are installed;

acquiring a second input information, wherein the second input information comprises an information confirming that an electrodynamic-suspension magnetic levitation train to be tested is placed on the auxiliary constraint platform and connected to the longitudinal pull rod;

sending a first control command, wherein the first control command comprises a command for controlling the simulated levitation device to start;

sending a second control command, wherein the second control command comprises a second command for controlling a vertical hydraulic actuator and a transverse hydraulic actuator to start; and acquiring a test data, wherein the test data comprises a first test data and a second test data; the first test data comprises data of an acceleration sensor arranged in the electrodynamic-suspension magnetic levitation train to be tested; and the second test data comprises data of a displacement sensor arranged in the electrodynamic-suspension magnetic levitation train to be tested.

7. The testing method of claim 6, further comprising:

acquiring a third input information, wherein the third input information comprises a first width, and the first width is a width that needs to be reached between the first track base and the second track base;

acquiring a fourth input information, wherein the fourth input information comprises a second width, and the second width is a current width between the first track base and the second track base;

calculating an information required for the first track base and the second track base to move to a target position according to a relationship between the first width and the second width, wherein the information comprises a moving direction and a moving distance needed by the first track base and the second track base;

acquiring a fifth input information if the moving distance is not zero, wherein the fifth input information comprises an information confirming that a bolt and a nut configured to fix the track base are loosened; and sending a third control command, wherein the third control command comprises a command for controlling the hydraulic cylinder to move the first track base and the second track base to the target position.

8. The testing method of claim 6, further comprising:

acquiring a third input information, wherein the third input information comprises a threshold of a temperature in the coil heat dissipation container;

acquiring a fourth input information, wherein the fourth input information comprises data of a temperature sensor in the coil heat dissipation container; and determining whether the data of the temperature sensor exceeds the threshold; and if the data of the temperature sensor exceeds the threshold, sending a third control command or a fourth control command, wherein the third control command comprises a command for controlling a cooling medium control device to increase an output power until the data of the temperature sensor is less than the threshold; and the fourth control command comprises a command for controlling an alarm device to issue an alarm signal.

* * * * *